US012172154B2

(12) United States Patent
Yanez et al.

(10) Patent No.: US 12,172,154 B2
(45) Date of Patent: Dec. 24, 2024

(54) FLUID DELIVERY DEVICE AND METHOD FOR CARRYING OUT CHEMICAL OR BIOLOGICAL ASSAYS

(71) Applicant: CTC Analytics AG, Zwingen (CH)

(72) Inventors: Antonio Lorenzo Yanez, Ecublens (CH); Marc Mouchet, Lausanne (CH); Michele Rodoni, Courgevaux (CH); Thomas Jermann, Röschenz (CH); Melchior Zumbach, Lenzburg (CH)

(73) Assignee: CTC Analytics AG, Zwingen (CH)

( * ) Notice: Subject to any disclaimer, the term of this patent is extended or adjusted under 35 U.S.C. 154(b) by 768 days.

(21) Appl. No.: 17/431,518

(22) PCT Filed: Feb. 18, 2019

(86) PCT No.: PCT/EP2019/053995
§ 371 (c)(1),
(2) Date: Aug. 17, 2021

(87) PCT Pub. No.: WO2020/169176
PCT Pub. Date: Aug. 27, 2020

(65) Prior Publication Data
US 2022/0126285 A1  Apr. 28, 2022

(51) Int. Cl.
*B01L 3/00* (2006.01)
*B01L 3/02* (2006.01)

(52) U.S. Cl.
CPC .......... *B01L 3/5025* (2013.01); *B01L 3/0237* (2013.01); *B01L 2200/021* (2013.01);
(Continued)

(58) Field of Classification Search
CPC ......... B01L 2200/021; B01L 2200/025; B01L 2200/0689; B01L 2200/141;
(Continued)

(56) References Cited

U.S. PATENT DOCUMENTS 4,090,850 A   5/1978   Chen et al.
5,814,700 A   9/1998   Brennan
(Continued)

FOREIGN PATENT DOCUMENTS

EP    3444033 A1     2/2019
WO    9511262 A1     4/1995
WO    2019034384 A1  2/2019

OTHER PUBLICATIONS

International Search Report and Written Opinion of the International Searching Authority dispatched Aug. 27, 2020 in parent application PCT/EP2019/053995.

*Primary Examiner* — Jennifer Wecker
(74) *Attorney, Agent, or Firm* — J-TEK LAW PLLC; Jeffrey D. Tekanic; Scott T. Wakeman

(57) ABSTRACT

A fluid delivery device includes at least one area onto which at least one support element having at least one well may be placed in a defined position. The fluid delivery device further includes at least one pipetting device having a connector configured to releasably connect the at least one pipetting device with a disposable tip and with a fluid displacement element which enables aspiration and ejection of a defined volume of liquid to or from the disposable tip. The at least one pipetting element is movable in a vertical and preferably in at least one horizontal direction. The fluid delivery device also includes a blowing element that has at least one aperture coupled to a source of pressurized gas and is movable in a vertical and preferably at least one horizontal direction. A system includes such a fluid delivery device and the at least one support element.

20 Claims, 5 Drawing Sheets

(52) U.S. Cl.
CPC . *B01L 2200/025* (2013.01); *B01L 2200/0689* (2013.01); *B01L 2200/146* (2013.01); *B01L 2200/16* (2013.01); *B01L 2300/0609* (2013.01); *B01L 2300/0663* (2013.01); *B01L 2300/0829* (2013.01); *B01L 2300/14* (2013.01); *B01L 2400/0478* (2013.01); *B01L 2400/0487* (2013.01); *B01L 2400/0622* (2013.01)

(58) Field of Classification Search
CPC ........... B01L 2200/146; B01L 2200/16; B01L 2300/0609; B01L 2300/0663; B01L 2300/0829; B01L 2300/14; B01L 2400/0478; B01L 2400/0487; B01L 2400/0622; B01L 2400/0688; B01L 3/0217; B01L 3/0237; B01L 3/0293; B01L 3/5025; G01N 2035/0418; G01N 35/10
See application file for complete search history.

(56) References Cited

U.S. PATENT DOCUMENTS

| | | |
|---|---|---|
| 5,948,359 A | 9/1999 | Kalra et al. |
| 2005/0238543 A1 | 10/2005 | Giblin |
| 2006/0002824 A1* | 1/2006 | Chang ................ G01N 35/1016 422/400 |
| 2009/0004754 A1 | 1/2009 | Oldenburg |
| 2009/0088336 A1 | 4/2009 | Burd et al. |
| 2010/0209298 A1 | 8/2010 | Kalra et al. |
| 2012/0132288 A1 | 5/2012 | Weitz et al. |
| 2013/0108521 A1* | 5/2013 | Ikushima ................ B05B 15/55 422/509 |
| 2014/0004552 A1 | 1/2014 | Favuzzi et al. |
| 2017/0045542 A1* | 2/2017 | Lapham .............. G01N 35/0099 |
| 2018/0154349 A1* | 6/2018 | Habbal .............. G01N 35/1011 |

* cited by examiner

FLUID DELIVERY DEVICE AND METHOD FOR CARRYING OUT CHEMICAL OR BIOLOGICAL ASSAYS

CROSS-REFERENCE

This application is the U.S. National Stage of International Application No. PCT/EP2019/053995 filed on Feb. 18, 2019.

TECHNICAL FIELD

The invention relates to a fluid delivery device as well as to a method for carrying out chemical or biological assay, especially with said fluid delivery device.

BACKGROUND ART

Different devices for delivering fluids to wells are known in the art. Such devices are for example used in connection with automated devices for carrying out chemical or biological assays and according methods. After an assay has been carried out, the well(s) have to be emptied of at least a part of a fluid present therein. Usually, the fluid delivery device is also used to aspirate fluid from said well(s). However, this may cause problems in relation to contamination of neighbouring wells or in relation to carryover of certain fluids.

Hence, alternative solutions in order to empty a well(s) are known in the art. For example, WO 95/11262 discloses a synthesis apparatus having a head assembly comprising a plurality of nozzles mounted thereto. The apparatus further comprises a base assembly with at least one orifice extending into a well, said orifice having an entrance into the well and an exit out of the well, said orifice being dimensioned such as to form a capillary liquid seal to retain the reagent solution in the well. Further, a pressure regulating device is provided for controlling a pressure differential such that upon the pressure differential exceeds a predetermined amount, a reagent solution is expelled from the well through the orifice.

US 2009/0004754 A1 describes a method of using a multi-well reservoir plate for biological and chemical assays. Each well includes a lower wall having a passage for the discharge of a substance hold in said well. The substance is held within the well by means of the surface tension. Discharge of the substance happens upon application of an external force to the substance. The force may be a pressure applied to the surface of the substance or a vacuum pressure applied to the discharge opening.

SUMMARY OF THE INVENTION

It is the object of the invention to create a fluid delivery device which allows the ejection of a fluid from a well with a highly reduced risk of cross-contamination or carryover and which allows fast processing as well a high versatility.

In one aspect of the present teachings, the fluid delivery device may comprise at least one area onto which at least one support element including at least one well may be placed in a defined position. The fluid delivery device further comprises at least one pipetting device, said at least one pipetting device including a connector to releasably connect said at least one pipetting device with a disposable tip as well as a fluid displacement element which allows the aspiration and ejection of a defined volume of liquid to or from said disposable tip. The at least one pipetting element is movable in a vertical and preferably in at least one horizontal direction. Further, the fluid delivery device comprises a blowing element with at least one aperture coupled to a source of pressurized gas, said at least one blowing element being movable in a vertical and preferably at least one horizontal direction.

By means of providing a blowing element which is separate from the pipetting device it is possible to increase the processing efficiency of the fluid delivery device, as it is possible to deliver fluid to a well and to empty another well by means of the pressurized gas at the same time. Further, as separate tools are used to deliver fluid and to supply pressurized air, the risk of cross-contamination and carryover is greatly reduced.

Preferably, the fluid delivery device according to the present invention is used for carrying out at least one chemical or biological assay. Preferably, said at least one chemical or biological assay is used to detect the presence or absence of an analyte, protein, nucleic acid, infectious agent, etc. in a probe.

In the present application, the term "analyte" is understood to include any chemical compound, such as for example a carbohydrate chain, a mono- or polysaccharide, a carboxylic acid, etc. For example, such a compound may be a hormone, a hormone like substance, cholesterol or any other chemical compound found in blood.

Preferably, the probe is a liquid. More preferably, the probe is blood, urine or another bodily fluid from a human or animal. The probe preferably is whole blood. Alternatively, the probe is blood serum. In a further alternative, the probe may comprise blood cells which have been separated from the blood serum, e.g. by means of centrifugation.

The at least one area preferably is in the form of a recess into which the support element may be inserted and hold in a defined position. Alternatively, the at least one area may be in the form of a platform onto which the support element may be placed. Preferably, said at least one area comprises means which allow the placement of the support element in a single orientation, e.g. in the form of form-fit elements or the like.

The at least one area preferably comprises means to releasably couple the support element on said at least one area. Hence, the support element may firmly be hold on said at least one area, e.g. during the time required to perform a specific assay. Preferably, said at least one area comprises a multitude of means to releasably couple a multitude of support elements on said at least one area.

In the present application, a well is understood as enclosed space having a surrounding wall and a top and bottom surface, of which at least the top surface is open or comprises means to insert a fluid or solid into the reaction well, within which at least a detection reaction is carried out in order to detect the presence or absence of an analyte, protein, nucleic acid, infectious agent, etc. in a probe.

The at least one pipetting device preferably comprises a drive which allows the actuation of the fluid displacement element such as to allow an automated aspiration and ejection of the defined volume of liquid to or from the disposable tip.

The liquid aspirated by and ejected from the disposable tip of the at least one pipetting device may be a probe, a reagent solution, wash solution and/or dilution solution. Hence, all liquids needed to carry out a specifc assay may be transferred into the at least one well by means of the at least one pipetting device.

Preferably, the fluid delivery device comprises at least one storage area where at least one container with disposable tips may be placed. Further, the fluid delivery device preferably also comprises a waste container into which used disposable tips may be disposed. In order to dispose of used disposable tips the pipetting device preferably comprises an ejection mechanism which allows ejecting used disposable tips automatically.

The disposable tips used in connection with the fluid delivery device preferably are conical pipette tips as widely known in the art. Depending on the application or type of assay with which the fluid delivery device according to the present invention is used, disposable tips with different volumes may be used. Preferably, the disposable tips used with the inventive fluid delivery device have volumes of 2 µl, 10 µl, 200 µl or 1000 µl. Depending on the type of assays which are to be carried out with the fluid delivery device according to the present invention, disposable tips with other smaller or higher volumes may be used.

The fluid delivery device according to the present invention preferably comprises means for the automated movement of said at least one pipetting element at least in the vertical and preferably in one horizontal direction. Preferably, said means for automated movement allow the movement of the at least one pipetting device in the vertical direction as well as in at least one horizontal direction, preferably in two horizontal directions.

The terms "vertical" and "horizontal" as used in the present application indicate the direction of a movement and are to be interpreted in the ordinary sense. I.e. the vertical direction means the direction which is parallel to the direction of gravity. Concurrently, the horizontal direction means a direction which is at a right angle to the direction of gravity.

The movement in the vertical and horizontal direction(s) relates to the normal operation of the fluid delivery device, i.e. the case where the fluid delivery device is properly mounted on a support surface and properly oriented.

Preferably, the fluid delivery device according to the present invention comprises means for the automated movement of said at least one blowing element in the vertical and at least in one horizontal direction. Preferably, said means for automated movement allow the movement of the at least one blowing element in the vertical direction as well as in at least one horizontal direction, preferably in two horizontal directions.

The means for the automated movement of said at least one pipetting device and said at least one blowing device preferably move the at least one pipetting device or the at least one blowing device in a linear fashion in the vertical and preferably in the at least one horizontal direction. In the case that the means for automated movement of the at least one pipetting device and of the at least one blowing element allow the movement of the at least one pipetting device and of the at least one blowing element in the vertical direction and in at least one horizontal direction the means for automated motion need to have at least two degrees of freedom.

The means of the automated movement of said at least one pipetting device and said at least one blowing element preferably comprise at least one electromechanical drive. Said at least one electromechanical drive preferably comprises at least one electrical motor, such as for example a stepper motor, as well as preferably at least one gearing which translates the rotational movement of the at least one electrical motor into a linear motion of the at least one pipetting device and the at least one blowing element. Said at least one gearing may be in the form of a rotating shaft, for example.

The at least one blowing element preferably comprises at least one means for controlling the delivery of the pressurized gas from said source of pressurized gas to the at least one aperture. Said means for controlling the delivery of the pressurized gas may preferably be in the form of at least one valve, such as for example a solenoid valve.

The fluid delivery device preferably comprises a control element which allows the control of the means for automated movement of said at least one pipetting device and said at least one blowing element as well as the drive for the actuation of the fluid displacement element of said at least one pipetting device and said ejection mechanism, if present.

The pressurized gas which is supplied by the source of pressurized gas preferably is compressed air. Alternatively, the pressurized gas may be an inert gas, such as argon or helium, oxygen, nitrogen, carbon dioxide, or a mixture thereof. The type of pressurized gas delivered by the source of pressurized gas may be chosen depending on the type of assays which are to be carried out with the fluid delivery device.

In one embodiment, the source of pressurized gas may be realized as connection port for connecting the fluid delivery device with at least one gas cylinder comprising the pressurized gas.

Preferably, the fluid delivery device or the at least one blowing element comprises at least one valve which allows to interrupt the connection between the source of pressurized gas and the at least one aperture. This allows to control the amount of pressurized gas which is delivered through the at least one aperture. Hence, it is possible to deliver a defined volume of pressurized gas through the at least one aperture.

Preferably, said fluid delivery device may comprise an optical reader in order to read information, such as an identification number, from a support device placed onto said at least one area.

The fluid delivery device preferably comprises means for moving a support element onto said at least one area and to remove a support element from said at least one area. Said means for moving a support element may be in the form of a movable gripper.

Preferably, a sealing lip is arranged around said at least one aperture of said blowing element. Provision of a sealing lip allows the sealing engagement of the at least one blowing element with a top surface of the support element around the at least one well, such that almost all of the pressurized gas delivered through the at least one aperture enters into the at least one well.

The fluid delivery device preferably comprises more than one pipetting device, preferably two, three, four or more pipetting devices. This allows to transfer a liquid or different liquids into different wells at the same time, thus allowing to carry out multiple assays at the same time. Preferably, the more than one pipetting devices are all connected to the same means for the automated movement. Alternatively, the more than one pipetting devices are connected to more than one means for automated movement. For example, always a defined number of pipetting devices may be connected to a means for the automated movement. As a further alternative, each pipetting device may be connected to a separate means for automated movement.

Preferably, said blowing element comprises more than one aperture, preferably between 4 and 12 apertures, more preferably 8 apertures. This allows delivering a defined volume of pressurized gas to multiple wells of a support element at the same time. The number of apertures of the at least one blowing element may vary depending on the kind of support element which is to be used in connection with the fluid delivery device.

Preferably, the number of apertures of the at least one blowing element corresponds to the number of wells of the support element intended for use in connection with the fluid delivery device. However, alternatively, if the support element intended for use with the fluid delivery device has a multitude of wells arranged in a rectangular matrix, then the number of apertures of the at least one blowing element is chosen to correspond the number of wells in one row or one column of the rectangular matrix.

Each of the apertures of the at least one blowing element is preferably connected by means of a tube to a common valve which is in turn connected to the source of pressurized gas, wherein each tube includes a pressure sensor.

The configuration with separate tubes including a pressure sensor for each of the apertures of the at least one blowing element allows to monitor the pressure of the pressurized gas passing through each of the tube. Hence, it is possible to detect a pressure build-up caused by a clogged aperture or a loss of pressure caused by a miss-aligned or defect sealing lip. Further, by monitoring the pressure it is also possible to detect problems associated with an emptying of the at least one well by means of the pressurized gas.

Further, the blowing element may comprise at least one flow rate meter, preferably one flow rate meter for each aperture or for each tube, which allows to measure the flow rate of the pressurized gas supplied to the at least one aperture. By measuring the flow rate it is possible to detect any occlusion of the at least one aperture or any other disturbance of the pressurized gas which may have a negative influence to the delivery of the pressurized gas to the at least one well.

Preferably, the source of pressurized gas is an air compressor, preferably supplying air with a pressure of up to 5 bar. Use of an air compressor makes the use of the fluid delivery device independent of an external supply of pressurized gas, such as a gas cylinder.

The fluid delivery device preferably comprises an electropneumatic regulator arranged between said source of pressurized gas and said at least one aperture in order to regulate the pressure of the pressurized gas supplied from said source of pressurized gas to said at least one aperture. Hence, depending on the size or type of the at least one well the pressure with which the pressurized gas is delivered may be regulated to an optimal value.

Preferably, the fluid delivery device comprises at least one actuator onto which said at least one pipetting device and said at least one blowing element are affixed. I.e. both the at least one pipetting device and the at least one blowing element are affixed to the same actuator.

In certain embodiments, the fluid delivery device may comprise more than one actuator, wherein one or more pipetting device(s) and one blowing element are affixed to each actuator.

In an alternatively preferred embodiment, the fluid delivery device comprises at least two actuators, wherein the at least one pipetting device is affixed to a first of said at least two actuators and said at least one blowing element is affixed to a second of said at least two actuators.

Hence, in this configuration, the at least one pipetting device is affixed on an actuator which comprises only the at least one pipetting device, or, in certain embodiments, more than one pipetting device. Concurrently, the at least one blowing element is affixed to an actuator which comprises only the at least one blowing element, or, in certain embodiments, more than one blowing element. This allows a separation of the pipetting device or devices from the blowing element or blowing elements.

In certain embodiments, the fluid delivery device may comprise more than one actuator to which only one or more than one pipetting devices are affixed to as well as more than one actuator to which only one or more blowing elements are affixed to.

The at least one actuator preferably is in the form of a gantry robot. Alternatively, the at least one actuator may be in the form of a robotic arm or delta robot.

Alternatively preferably, the at least one pipetting device and the at least one blowing element are affixed to an actuator each, the actuators moving the at least one pipetting device and the at least one blowing element in the vertical direction, wherein the actuators are attached to a head, the head being movable in the at least one horizontal direction by means of a gantry.

The present application further concerns a system comprising a fluid delivery device as described above as well as at least one support element arranged on said at least one area. The at least one support element comprises at least one well with a bottom surface into which a liquid may be filled, as well as at least one waste tank arranged beneath said at least one well. The well further comprises at least one opening on said bottom surface, said opening connecting the at least one well with the at least one waste tank and being configured such that a liquid filled within said at least one well only flows through the opening into the waste tank when a pressurized gas is delivered into said at least one well.

Preferably, the support element comprises a separate waste tank for each well present on the support element. Alternatively, the support element comprises only one waste tank. In a further alternative, the support element comprises several waste tanks, wherein several wells of the support element are connected to a single waste tank by means of their respective openings. This means that the total amount of wells is subdivided into a number of groups corresponding to the number of waste tanks present in the support element, wherein all wells belonging to the same group are connected to the same waste tank by means of their respective openings.

A bottom surface of the at least one well is preferably coated with at least one chemical or biological binding agent suitable to bind to the analyte, protein, nucleic acid and/or infectious agent to assay its presence in a probe.

The term "infectious agent" is understood to comprise bacteria, viruses, protozoa and any other agent which may cause a disease in a human being.

The biological binding agent preferably is an enzyme, protein or antibody. Preferably, the bottom surface of the at least one well is coated with an array of different biological binding agents, such as to allow the use of each well for an assay of the multiplex type. For example, the at least one well may be coated with an array of antibodies specific for different antigens. In the case that the support element comprises more than one well, each well may be coated with the same biological binding agent(s) or the same array of biological binding agents. Alternatively, each well of the support element has a bottom surface coated with different biological binding agents or a different array of biological binding agents.

Preferably, the support element is a microwell plate having several wells as known in the art. Preferably, the plate comprises from 6 to 1536 wells, more preferably 48 or 96 wells. However, the number of wells may vary depending on the specific application the inventive fluid delivery device is used.

Preferably, the bottom surface of the at least one well comprises only one opening. However, the bottom surface may also comprise more than one opening, such as two, three, four or more openings. In essence, the number of openings provided on the bottom surface may be varied depending on the size and/or shape of the bottom surface.

The bottom surface of the at least one well preferably is flat.

Preferably, said system further comprises an optical detector in order to detect an optical signal in the at least one well of the at least one support element or to make a picture of the at least one well. By means of the optical detector, the result of any assay or assays carried out in said at least one well of the at least one support element.

Preferably, the at least one area comprises at least one heating element. Said at least one heating element is arranged in such a way on said at least one area that the at least one heating element contacts the at least one support element arranged on the at least one area over an entire side thereof. This allows to heat the at least one well as well as any liquid contained therein to a defined temperature, e.g. for incubation. The at least one well of the at least one support element is preferably shaped such as to have one surface of the surrounding wall parallel to the at least one heating element when the at least one support element is arranged on the at least one area.

Preferably, the at least one support element of the system further comprises at least one storage vessel comprising a reagent solution, wash solution and/or dilution solution.

Preferably, the at least one storage vessel comprises a reagent solution, wash solution and/or dilution solution used for a specific assay. The storage vessel comprises an enclosed space having a surrounding wall and a top and bottom surface, of which at least the top surface is open or comprises means to access a fluid or solid present in the storage vessel. The at least one storage vessel comprises a reagent solution, wash solution and/or dilution solution in a quantity which is sufficient to carry out the assay in each of the wells present on the support element. Hence, the volume of the solution contained in said at least one storage vessel is selected such as to allow carrying out an assay in the at least one well or in the case that the support element comprises more than one well, in each of said wells. Further, the number of storage vessels is selected such that all solutions needed to carry out the assay(s) in all the wells of the support element are present in the storage vessels of the support element. In the event that the wells allow carrying out different assays with the cartridge, the number of storage vessels and the volumes of solutions carried therein are selected such that a sufficient amount of the solutions needed for each specific assay is present.

A support element with such a configuration may also be referred to as cartridge, since it comprises all the necessary elements to carry out a specific assay or assays, even including any waste liquid resulting from the assay or assays. After completion of the assay or assays the cartridge may be removed and discarded.

Preferably, the number of storage vessels of said support element are such that all reagent solutions, wash solutions and/or dilution solutions needed to carry out a specific assay in said at least one well are present in said support element.

Such a cartridge solution offers the great advantage that all reagent solutions, wash solutions and/or dilution solutions used to carry out the assay or assays are each from a single, defined batch. Hence, the tracking and documentation of the solution batches used for each assay is greatly facilitated.

Preferably, the number of apertures of said blowing element corresponds to the number of wells of the support element.

Preferably, a sealing lip having a shape matching the shape of the at least one well is arranged around said at least one aperture. This allows a good sealing between the at least one blowing element and said at least one well.

The at least one opening of the at least one well preferably has a dimension and form which is such that a flow of a liquid present in the well through the opening is prevented by a surface tension of said liquid.

Preferably, the at least one opening is dimensioned and formed such that water is prevented from flowing through the opening by its surface tension. Delivery of a pressurized gas into the well will however press the liquid through the opening and into the at least one waste tank arranged below the at least one well.

This allows to provide a simple and easy to manufacture, yet effective configuration of the at least one opening.

A further object of the present invention is to provide a method for carrying out a chemical or biological assay with the fluid delivery device. The method comprises in a first step the arranging of a support element with at least one well on said at least one area. The at least one well has a bottom surface with an opening, said opening is configured such that a liquid filled within said at least one well only flows through the opening into a waste tank arranged in the support element beneath said at least one well when a pressurized gas is delivered into said at least one well. Then, at least one liquid is delivered into the at least one well by means of the at least one pipetting device. Subsequently, after a defined time period, said at least one blowing element is moved onto said support element such that the at least one aperture is positioned on said at least one well. Finally, a defined volume of pressurized gas is delivered through the at least one aperture in order to push the at least one liquid out through the opening into the waste tank.

The defined time period is chosen such as to be optimal for the chemical or biological assay carried out. The defined time period preferably corresponds to an incubation period for a specific assay being carried out in the at least one well.

Preferably, more than one liquid is delivered to the at least one well by the at least one pipetting device. Preferably, the delivering of different liquids to the at least one well by means of the at least one pipetting device is carried out in a sequence which is specific for the assay carried out in the at least one well. Preferably, the delivery of any liquid is only carried out after a specific time period.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

DESCRIPTION OF PREFERRED EMBODIMENTS

Figure 1:
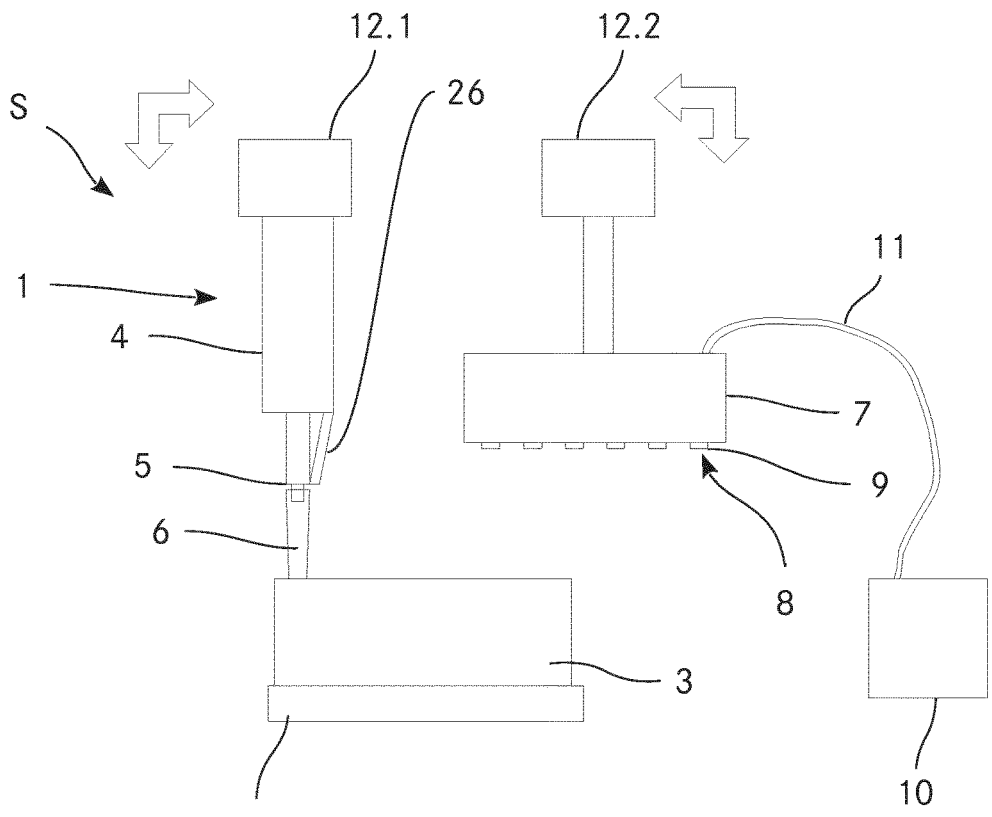
FIG. 1 a schematic representation of a first embodiment of system with a fluid delivery device and one support element according to the present invention.

FIG. 1 shows a schematic representation of a first embodiment of system S with a fluid delivery device 1 according to the present invention. The fluid delivery device 1 comprises an area 2 onto which a support element 3, which is a cartridge in the embodiment shown, may be arranged in a defined position. The support element 3 comprises multiple wells into which a liquid may be delivered. For liquid delivery, the fluid delivery device 1 comprises a pipetting device 4. The pipetting device 4 includes a connector 5 which allows connecting a disposable tip 6 in a releasable manner to the pipetting device 4. Further, the pipetting device 4 comprises a fluid displacement device (not shown), e.g. in the form of an actuated piston located within the pipetting device 4, in order to aspirate and eject a defined volume of liquid into or from the disposable tip 6. The pipetting device also includes an ejection mechanism 26 with which the disposable tip 6 attached to the connector 5 may be automatically ejected therefrom. In the embodiment shown, the ejection mechanism 26 is in the form of a peg which pushes onto an upper rim of the disposable tip 6 in order to slide the disposable tip 6 from the connector 5.

Further, the fluid delivery device 1 comprises a blowing element 7. In the shown embodiment, the blowing element 7 comprises eight apertures 8 which are each surrounded by a sealing lip 9. The blowing element 7 is connected to an air compressor 10 which serves as source of pressurized gas by means of a tubing 11. Pressurized air is delivered by the air compressor 10 via the tubing 11 to the eight apertures 8 of the blowing element 7. Within the blowing element 7 tubes are provided which distribute the compressed air from the tubing 11 to the eight apertures 8.

The fluid delivery device additionally comprises a first actuator 12.1 and a second actuator 12.2. The pipetting device 4 is connected to the first actuator 12.1 and the blowing element 7 is connected to the second actuator 12.2. Both actuators 12.1, 12.2 allow the movement of the pipetting device 4 and of the blowing element 7 in the vertical direction and in one horizontal direction, as is depicted by the broad arrows.

The system S further includes one support element 3 with eight wells. In FIG. 1, the pipetting device 4 of the fluid delivery device 1 has been moved by the first actuator 12.1 such that the disposable tip 6 is inserted into a well of the support element 3, e.g. such as to aspirate or eject a volume of liquid from or into said well.

Figure 2:
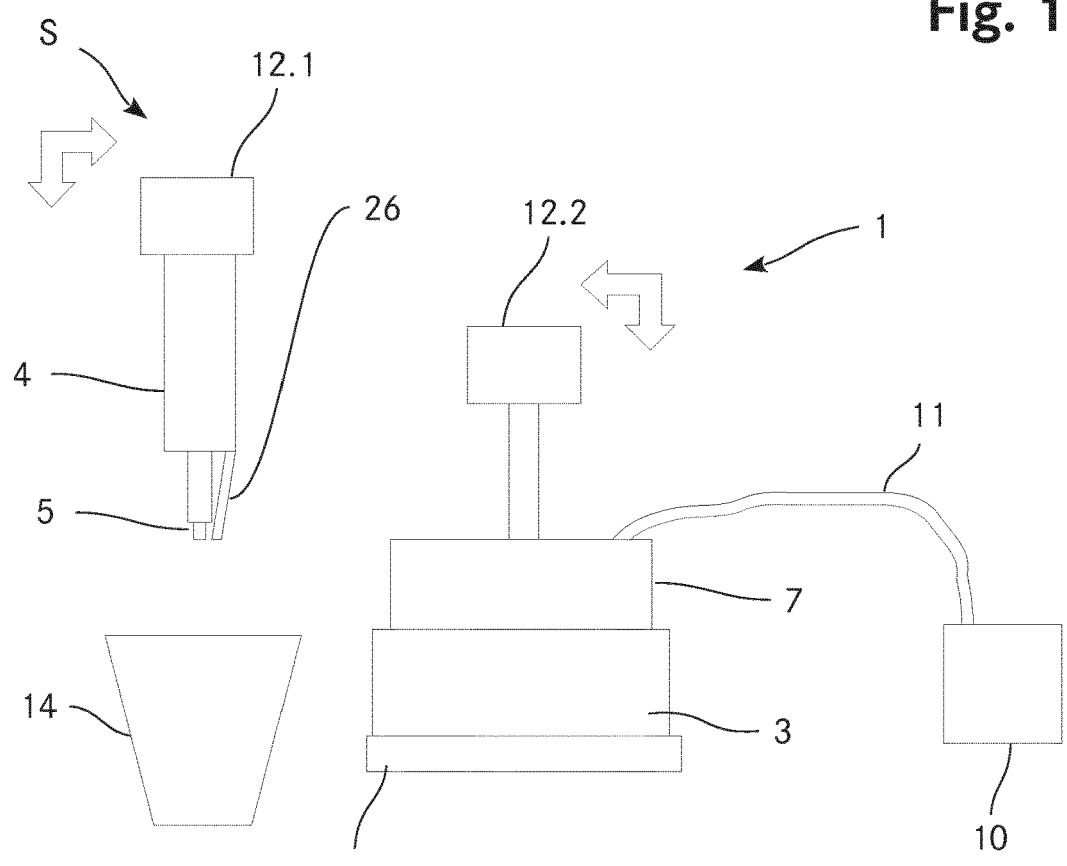
FIG. 2 the system according to FIG. 1 wherein the pipetting device and the blowing element have been moved.

FIG. 2 shows the system S as shown in FIG. 1, wherein both the pipetting device 4 and the blowing element 7 have been moved by means of the actuators 12.1, 12.2. The pipetting device 4 has been moved by means of the first actuator 12.1 to a position above a waste container 14. The disposable tip 6 has been ejected from the connector 5 by means of the ejection mechanism 26.

The blowing element 7 has been moved by the second actuator 12.2 into contact with an upper surface of the support element 3. Thereby, the apertures 8 with the sealing lips 9 are aligned with the wells of the support element 3. Said alignment is enabled by the fact that the area 2 ensures the placement of the support element 3 at a defined position and in a defined orientation. In the positon as shown, a defined volume of compressed air may be delivered to the wells of the support element 3 by means of the air compressor 10 via tubing 11 and apertures 8. The sealing lips 9 thereby ensure that the entire volume of compressed air is delivered to the wells and that none or substantially none of the volume of compressed air escapes.

Figure 3:
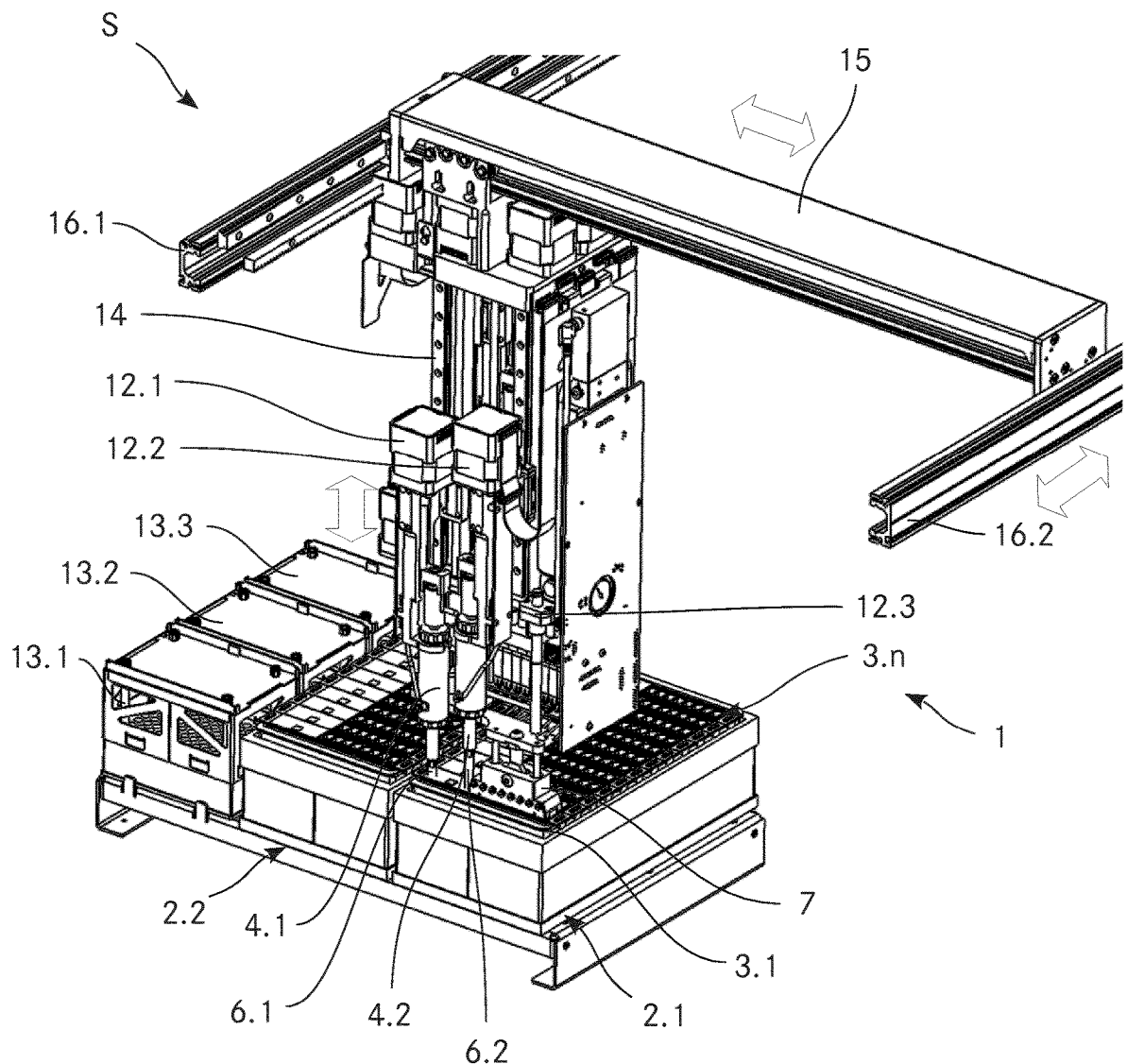
FIG. 3 a three-dimensional view of another embodiment of a system S with a fluid delivery device and a multitude of support elements according to the present invention.

FIG. 3 shows a three-dimensional view of another embodiment of a system S with a fluid delivery device 1 according to the present invention. In this embodiment, the fluid delivery device 1 comprises two areas 2.1, 2.2 onto which a multitude of support element 3.1 . . . 3.n may be placed, each in a defined orientation and position. Further, the fluid delivery device 1 includes three storage areas 13.1, 13.2, 13.3 where disposable tips 6 may be stored in appropriate racks.

The fluid delivery device 1 according to the embodiment shown comprises two pipetting devices 4.1, 4.2 as well as one blowing element 7. Both pipetting devices 4.1, 4.2 as well as the blowing element 7 are affixed to an actuator 12.1, 12.2, 12.3 with which the two pipetting devices 4.1, 4.2 as well as the blowing element 7 may be moved in the vertical direction. All three actuators 12.1, 12.2, 12.3 are attached to a head 14 which is itself connected to a gantry 15 such as to be movable linearly along said gantry 15 in a first horizontal direction. The gantry 15 is connected to two guide rails 16.1, 16.2 and may move in a linear fashion about a second horizontal direction along said guide rails 16.1, 16.2. Hence, by the combination of the actuators 12.1, 12.2, 12.3 as well as the combination of head 14, gantry 15 and guide rails 16.1, 16.2 the pipetting devices 4.1, 4.2 as well as the blowing element 7 may be moved in three spatial directions. It is to be noted that in the embodiment shown the two pipetting devices 4.1, 4.2 as well as the blowing element 7 may only independently move in the vertical direction, any movement of the head 14 along any of the two horizontal directions will concurrently move the two pipetting devices 4.1, 4.2 as well as the blowing element 7 together.

Figure 4:
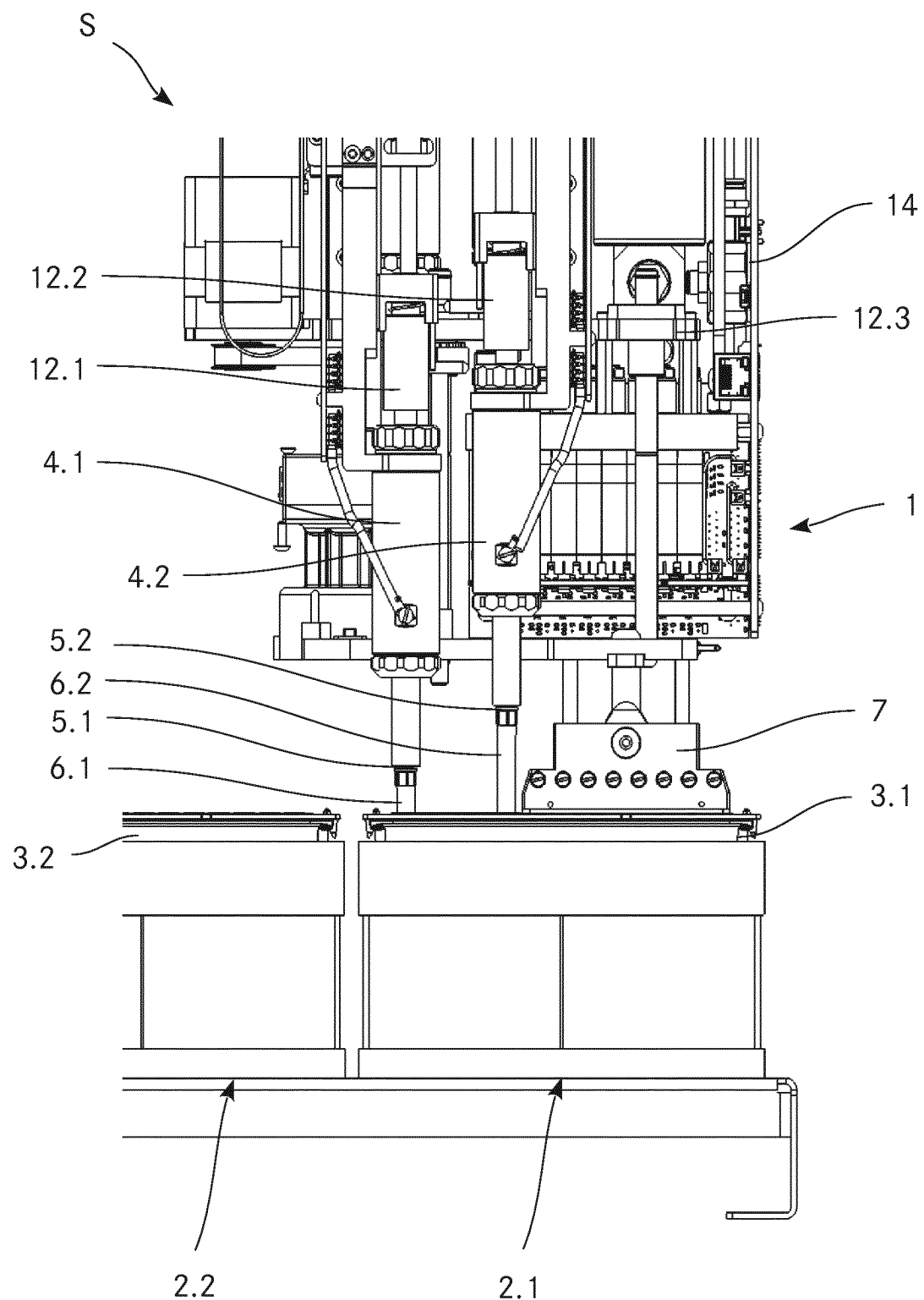
FIG. 4 a detailed and magnified partial view of the system according to FIG. 3.

FIG. 4 is a detailed and magnified partial view of the system S according to FIG. 3, showing the interactions of the pipetting devices 4.1, 4.2 as well as of the blowing element 7 with a first support element 3.1. As is shown, disposable tips 6.1, 6.2 are attached to the connectors 5.1, 5.2 of both pipetting devices 4.1, 4.2. The disposable tips 6.1, 6.2 of both pipetting devices 4.1, 4.2 are inserted into storage vessels of the first support element 3.1. The blowing element 7 is positioned on a top surface of the first support element 3.1, wherein each of the apertures of the blowing element 7 are aligned with a well of the first support element 3.1 (see FIG. 5 for details).

Figure 5:
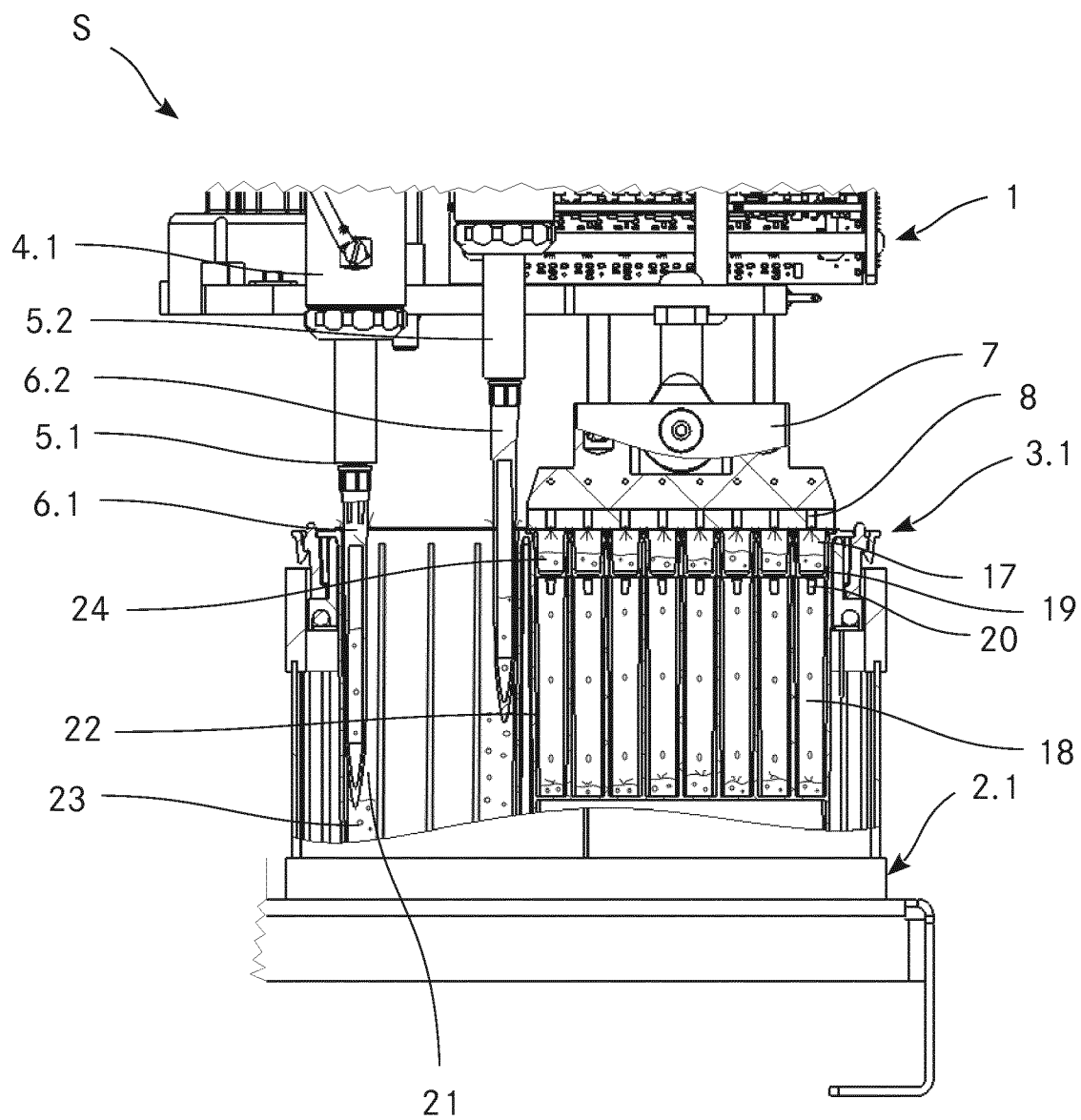
FIG. 5 a more detailed partial cut-away view of FIG. 4 focusing onto the first support element.

FIG. 5 is a more detailed partial cut-away view of FIG. 4 focussing onto the first support element 3.1. The first support element 3.1 comprises a housing 22 and eight wells 17 (of which only one comprises reference numbers for representational reasons). Each well 17 has an opening 19 connecting the respective well 17 with a waste tank 18 located beneath the well 17. The opening 19 is shaped and dimensioned such that a flow of liquid through said opening 19 is prevented by the surface tension of the liquid. Further, each opening 19 has an outlet 20 extending into the respective waste tank 18. The wells 17 are open on a top surface of the first support element 3.1. As shown, a probe 24 is present in each of the wells 17.

Further, the first support element 3.1 comprises five storage vessels 21 (of which only four are shown in the cut-away due to the selection of the cut-away plane). Each storage vessel 21 comprises a solution 23, such as a reagent solution, wash solution and/or dilution solution used for a specific assay. A support element 3 with such a configuration may also be referred to as cartridge, since it comprises all the necessary solutions as well as wells 17 to carry out a specific assay or assays, even including waste tanks 18 to hold waste liquid resulting from the assay or assays. After completion of the assay or assays the cartridge may be removed and discarded.

As is shown in FIG. 5, a solution 23 present in the storage vessels 21 is being aspirated into the disposable tips 6.1, 6.2 of the pipetting devices 4.1, 4.2. Further, as may be seen, the blowing element is in contact with an upper surface of the first support element 3.1 such that each of the eight apertures 8 is aligned with a well 17 of the first support element 3.1. As shown, a pressurized gas is being delivered through the apertures 8 into the wells 17, leading to an outflow of liquid through the apertures 19 into the respective waste tanks 18.

Figure 6:
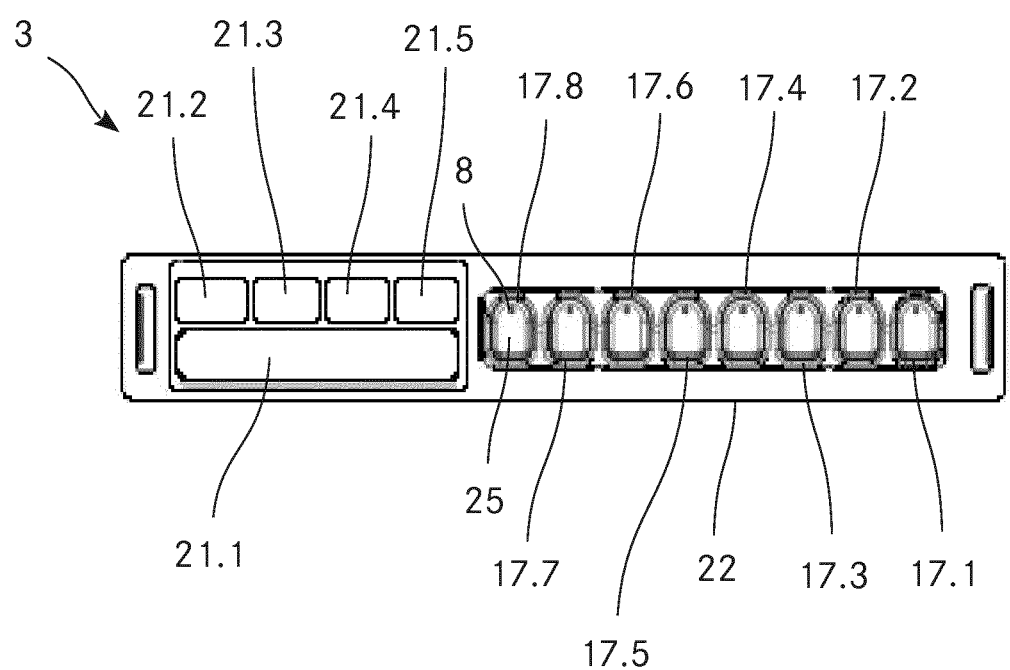
FIG. 6 a top view of an embodiment of a support element used in connection with a system and a fluid delivery device according to the present invention.

FIG. 6 shows a top view of an embodiment of a support element 3 used in connection with a system S and a fluid delivery device 1 according to the present invention. As may be seen, the support element 3 comprises a housing 22 with a cuboid shape. Viewed from top, the housing 22 is of rectangular shape. Eight wells 17.1-17.8 are arranged in the housing 22 of the support element 3, each well 17.1-17.8 having a basic rectangular shape with one of the short sides being in the shape of a half-circle. Each well 17.1-17.8 comprises a flat bottom surface 25.1-25.8 onto which at least one biological binding agent, preferably a multiplicity of biological binding agents are arranged in a matrix. Each of the wells 17.1-17.8 comprises an aperture 8.1-8.8 which connects the respective well 17.1-17.8 to a waste tank. Further, the support element 3 includes five storage vessels 21.1-21.5. A first storage vessel 21.1 has a larger size than the other four storage vessels 21.2-21.5. Typically, the first storage vessel 21.1 contains a wash solution which is used in greater quantity than any of the reagent solutions and/or dilutions solutions contained in the other four storage vessels 21.2-21.5.

The invention claimed is:

1. A fluid delivery device comprising:
   at least one area onto which a support element including at least one well is placeable in a defined position,
   at least one pipetting device including a connector configured to releasably connect the at least one pipetting device with a disposable tip and with a fluid displacement element to enable aspiration and ejection of a defined volume of liquid to or from the disposable tip, the at least one pipetting element being movable at least in a vertical direction,
   a blowing element having at least one aperture coupled to a source of pressurized gas, the at least one blowing element being movable at least in the vertical direction, and
   at least a first actuator and a second actuator,
   wherein the at least one pipetting device is affixed to the first actuator and the at least one blowing element is affixed to the second actuator.

2. The fluid delivery device according to claim 1, further comprising a sealing lip arranged around the at least one aperture of the blowing element.

3. The fluid delivery device according to claim 1, wherein the fluid delivery device comprises more than one pipetting device.

4. The fluid delivery device according to claim 1, wherein the blowing element comprises more than one aperture.

5. The fluid delivery device according to claim 4, wherein:
   each of the apertures is respectively connected via a tube to a common valve which is connected to the source of pressurized gas, and
   each of the tubes includes a pressure sensor.

6. The fluid delivery device according to claim 1, wherein the source of pressurized gas is an air compressor.

7. The fluid delivery device according to claim 1, further comprising:
   an electro-pneumatic regulator arranged between the source of pressurized gas and the at least one aperture and configured to regulate the pressure of the pressurized gas supplied from the source of pressurized gas to the at least one aperture.

8. A fluid delivery device comprising:
   at least one area onto which a support element including at least one well is placeable in a defined position,
   at least one pipetting device including a connector configured to releasably connect the at least one pipetting device with a disposable tip and with a fluid displacement element to enable aspiration and ejection of a defined volume of liquid to or from the disposable tip, the at least one pipetting element being movable at least in a vertical direction, and
   a blowing element having at least one aperture coupled to a source of pressurized gas, the at least one blowing element being movable at least in the vertical direction, wherein:
   the at least one pipetting device and the at least one blowing element are respectively affixed to first and second actuators,
   the first and second actuators are respectively configured to move the at least one pipetting device and the at least one blowing element in the vertical direction, and
   the first and second actuators are attached to a head that is movable in at least one horizontal direction by a gantry.

9. A system comprising:
   the fluid delivery device according to claim 1, and
   at least one support element arranged on the at least one area, the at least one support element comprising at least one well having a bottom surface into which a liquid is fillable, and at least one waste tank arranged beneath the at least one well,
   wherein the well comprises at least one opening on the bottom surface connecting the at least one well with the at least one waste tank, the opening being configured such that a liquid filled within the at least one well only flows through the opening into the waste tank in response to a pressurized gas being delivered into the at least one well.

10. The system according to claim 9, wherein the at least one support element further comprises at least one storage vessel comprising a reagent solution, a wash solution and/or a dilution solution.

11. The system according to claim 10, wherein the support element has a number of storage vessels such that all reagent solutions, wash solutions and/or dilution solutions needed to carry out a specific assay in the at least one well are present in the support element.

12. The system according to claim 9, wherein the blowing element has a number of apertures that corresponds to the number of wells of the support element.

13. The system according to claim 9, further comprising:
a sealing lip having a shape matching the shape of the at least one well and being arranged around the at least one aperture.

14. The system according to claim 9, wherein a dimension and form of the at least one opening are designed such that liquid present in the well is prevented from flowing through the opening by surface tension of the liquid.

15. A method for carrying out a chemical or biological assay using a system according to claim 9, comprising:
 a) arranging a support element having at least one well the at least one area, the at least one well having a bottom surface having an opening configured such that a liquid filled within the at least one well only flows through the opening into at least one waste tank arranged in the support element beneath the at least one well in response to a pressurized gas being delivered into the at least one well;
 b) delivering at least one liquid into the at least one well via the at least one pipetting device;
 c) moving the blowing element onto the support element such that the at least one aperture is positioned on the at least one well after a defined time period; and
 d) delivering a defined volume of pressurized gas through the at least one aperture and thereby pushing the at least one liquid out through the opening into the at least one waste tank.

16. The fluid delivery system according to claim 1, wherein the at least one pipetting element is also movable in at least one horizontal direction.

17. The fluid delivery system according to claim 1, wherein the first and second actuators are respectively configured to move the at least one pipetting device and the at least one blowing element in the vertical direction.

18. The fluid delivery system according to claim 1, wherein the at least one blowing element is also movable in at least one horizontal direction.

19. The fluid delivery system according to claim 18, wherein the at least one pipetting element is also movable in at least one horizontal direction.

20. The fluid delivery system according to claim 19, wherein the first and second actuators are respectively configured to move the at least one pipetting device and the at least one blowing element in the vertical direction.

\* \* \* \* \*